United States Patent [19]

Versteegh

[11] 4,024,323
[45] May 17, 1977

[54] BATTERY SEPARATOR

[75] Inventor: Willem Martin Versteegh, Palo Alto, Calif.

[73] Assignee: Evans Products Company, Portland, Oreg.

[22] Filed: Apr. 19, 1976

[21] Appl. No.: 678,411

Related U.S. Application Data

[63] Continuation of Ser. No. 547,376, Feb. 6, 1975, abandoned.

[52] U.S. Cl. .............................. 429/249; 260/897 C
[51] Int. Cl.$^2$ .......................................... H01M 2/16
[58] Field of Search ................ 429/249; 260/897 C, 260/897 B

[56] References Cited
UNITED STATES PATENTS.

| | | | |
|---|---|---|---|
| 3,427,206 | 2/1969 | Scardaville | 136/146 |
| 3,536,796 | 10/1970 | Rock | 136/146 X |
| 3,869,422 | 3/1975 | Dawes | 260/897 B |
| 3,876,735 | 4/1975 | Bontenck | 260/897 C |

*Primary Examiner*—John H. Mack
*Assistant Examiner*—Hugh A. Feeley
*Attorney, Agent, or Firm*—Robert E. Howard

[57] ABSTRACT

A battery separator comprising a microporous sheet formed substantially of a mixture of polymeric constituents. One of the polymeric constituents is an ultra high molecular weight polyolefin having a standard load melt index of substantially 0 and an intrinsic viscosity greater than about 3.0. The other polymeric constituent is either a copolymer of an olefin and an ethylenically unsaturated monocarboxylic acid selected from the group consisting of acrylic acid and methacrylic acid, or a blend of a low molecular weight polyolefin and a polymer of acrylic or methacrylic acid.

6 Claims, No Drawings

BATTERY SEPARATOR

This is a continuation of application Ser. No. 547,376, filed Feb. 6, 1975, now abandoned.

BACKGROUND OF INVENTION

Battery separators are porous diaphragms placed between the positive and negative plates of a battery so that the electrolyte forms the sole internal conducting path between them. Generally, separators have ribs on the side presented to the positive plate and are flat on the side presented to the negative plate.

It is generally considered to be desirable in the battery separator art to employ the smallest possible pore size since this reduces the danger of active materials being forced through or growing through the separator thereby causing shorting between the plates thereof or other detrimental effects. Also, a separator should have a relatively low electrical resistance.

U.S. Pat. No. 3,351,495 discloses a battery separator having a relatively low pore size and satisfactory electrical resistance characteristics made from a high molecular weight polyolefin having an average molecular weight of at least 300,000, a standard load melt index of substantially zero, and a reduced viscosity of not less than 4. The separator is manufactured by extruding the high molecular weight polyolefin in admixture with an inert filler and a plasticizer by the subsequently extracting the plasticizer by the use of a suitable solvent.

SUMMARY OF THE PRESENT INVENTION

It is an object of the present invention to provide a battery separator formed of a blend of polymer constituents, one of which is an ultra high molecular weight polyolefin, the separator having improved characteristics and improved ease of manufacturing.

These and other objects are attained by employing as the polymer a mixture of an ultra high molecular weight polyolefin with either a polyolefin copolymer formed of an olefin and an ethylenically unsaturated monocarboxylic acid selected from the group consisting of acrylic and methacrylic acids, or a blend of a low molecular weight polyolefin and a polymer of an ethylenically unsaturated monocarboxylic acid selected from the group consisting of acrylic and methacrylic acids, and mixtures thereof.

DESCRIPTION OF PREFERRED EMBODIMENTS

It has been discovered that an improved polyolefin battery separator can be formed from an ultra high molecular weight polyolefin if the polyolefin is blended with either a polyolefin copolymer formed of an olefin and either acrylic or methacrylic acid or a blend of a low molecular weight polyolefin and a polymer of acrylic or methacrylic acid. While aforementioned U.S. Pat. No. 3,351,495 states that blends of polyolefins may be employed, it is also stated that such blends must have a standard load melt index of "substantially" zero, and a reduced viscosity greater than 4.0. As is well known in the art, it is very difficult to extrude such high molecular weight materials. While the addition of plasticizers and other additives to the blend somewhat eases the problem of extrusion, it is still a very slow process. In addition, since the plasticizer is subsequently removed by solvent extraction, the larger the amount of plasticizer employed the larger the extraction and subsequent solvent separation problem.

The present invention resides in the discovery that at least 40% of the ultra high molecular weight polyolefin, and preferably between about 50% and 70% by weight thereof can be replaced by a polyolefin copolymer or a blend of a low molecular weight polyolefin and a polymer of acrylic or methacrylic acid to the extent that the standard load melt index of the polymer mixture is above zero. This substitution not only permits a higher extrusion speed to be employed in the manufacturing process with no substantial loss in properties, but it has also been found that with the particular polyolefin copolymers or blends that form the present invention, additional beneficial results are obtained.

It has been found for example that the particular polyolefin copolymers or blends of polyolefin and polymer of acrylic or methacrylic acid employed in the present invention enhance the adhesion of the filler material within the polymer matrix.

Also, by utilizing the polyolefin copolymer or blend which improves the adhesion of the filler particles to the polymer matrix with no substantial loss in properties, the cost of the resultant product is somewhat decreased and certain properties thereof enhanced.

The particular copolymer or blend forming the present invention also appears to improve the wettability of the final separator product. separator product.

The ultra high molecular weight polyolefin employed in the present invention may be any of those mentioned in the aforementioned Pat. No. 3,351,495, and includes both homopolymers and copolymers. Particularly preferred, however, are high density polyethylene and substantially isotactic polypropylene homopolymers having a standard load melt index of less than about 0.04 g per 10 minutes and preferably 0 when measured in accordance with ASTM D 1238-70 and have an intrinsic viscosity greater than about 3.0. Herein, whenever "ultra high molecular weight polyolefin" is referred to it is intended to include both ultra high molecular weight homopolymers and copolymers, and for that reason it may be more accurate to specify their molecular characteristics in terms of intrinsic viscosity since melt index is, technically speaking, not a fundamental polymer property, but an empirically defined parameter dependent upon molecular weight and branching as well as their respective distributions. Melt index can also be critically influenced by the measurement conditions.

The polyolefin copolymer constituent of the present invention desirably contains from about 1% up to about 10% by weight of an ethylenically unsaturated monocarboxylic acid selected from the group consisting of acrylic acid, methacrylic acid and mixtures thereof. The olefin component of the polyolefin copolymer may be either a single olefin or a mixture of olefins (terpolymer); therefore, use of the term "copolymer" herein is intended to include "terpolymers." The preferred olefins are ethylene and propylene. The olefin constituent of the copolymer desirably comprises between about 90% up to about 99% by weight of the copolymer or terpolymer. Examples of suitable polyolefin copolymers are ethylene — acrylic and/or methacrylic acid, and propylene — acrylic and/or methacrylic acid. Suitable terpolymers that might be employed include ethylene — propylene — acrylic and/or methacrylic acid and ethylene — vinyl acetate — acrylic and/or methacrylic acid.

It appears that the optimum content of the ethylenically unsaturated monocarboxylic acid component in the polyolefin copolymer is between 3% and 4% by weight thereof, with the olefin component comprising between about 96% and 97% by weight thereof.

While the polymeric mixture of the present invention preferably involves a mixture of an ultra high molecular weight polyolefin and a copolymer of an olefin with an ethylenically unsaturated monocarboxylic acid, it has been found that low molecular weight polyolefin homopolymers or copolymers may be employed in addition to these two components, it only being desirable to maintain the level of the ultra high molecular weight component between about 30% to about 60% by weight of said polymeric mixture, and to maintain the level of the acid component of the copolymer at a level such that it constitutes between about 1% and about 10% by weight of the copolymer plus low molecular weight polyolefin portion of the polymeric mixture. For example, if the copolymer contains 7% by weight of the acid component and 93% by weight of the olefin component, the polymeric mixture may have added thereto a low molecular weight polyolefin compatible with the olefin of the copolymer which, in effect, dilutes the amount of acid component to a level lower than 7%, thereby effecting a cost savings. However, the amount of such additional lower molecular weight polyolefin or polyolefins should preferably not be so great as to dilute the level of the acid component in the non-ultra high molecular weight polyolefin portion of the polymeric mixture to less than 1% by weight thereof. It can be readily seen that the copolymer may have an acid content higher than 10% and be "diluted" to the 1-10% range by addition of a compatible low molecular weight polyolefin.

The same criteria apply where a blend of a low molecular weight polyolefin polyolefins a polymer of acrylic or methacrylic acid are employed; i.e., the amount of the acrylic or methacrylic acid polymer component in the blend should be such that the acid component constitutes between about 1% and about 10% by weight of the blend ethylene the low molecular weight polyolefin and acrylic or methacrylic acid polymer.

The term "low molecular weight" polyolefin is intended to mean polyolefins; having a melt index greater than 0, and preferably greater than about 10, and/or an intrinsic viscosity less than about 3.0, and preferably less than about 2.0. The preferred low molecular weight polyolefins are homopolymers and copolymers of thylene and propylene.

The term "polymer of acrylic or methacrylic acid" is intended to include both homopolymers and copolymers of acrylic or methacrylic acid or mixtures thereof. Suitable copolymers of acrylic or methacrylic acid have been described previously in the discussion of polyolefin copolymers. Other copolymers may be employed as long as the acid monomer is present in the copolymer in an amount sufficient to provide the 1-10% by weight levels previously discussed. The particular monomer copolymerized with the acid monomer is not critical since physical and not chemical phenomena are involved in the extrusion process and product properties.

In forming the battery separator of the present invention, the polymeric mixture is blended with a suitable siliceous filler such as silica, mica, talc, glass particles, diatomaceous earth, etc. By "siliceous" it is intended to mean an inorganic composition containing $SiO_2$ or $SiO_2 \cdot xH_2O$. It is preferred to blend the siliceous filler with the polyolefin copolymer or polymer of acrylic or methacrylic acid as a separate step in the blending of the ingredients prior to extrusion since it is the copolymer or polymer of acrylic or methacrylic acid which provides improved adhesion of the filler to the polyolefin matrix. The amount of filler employed may range from about 10 to about 90% by weight of the extrusion mixture. The filler material desirably has a small particle size, ranging between about 0.01 and about 10.0 microns.

The extrusion mixture also has blended therein a suitable plasticizer in amounts ranging from about 20 to about 70% by weight of the mixture. The plasticizer may be any of those specified in aforementioned U.S. Pat. No. 3,351,495, but petroleum (mineral) oil has been found to be particularly useful due to its ready availability and ease of handling.

Carbon black in amounts ranging from about 0 to about 10% by weight of the extrusion mixture is also desirably employed. The carbon black provides some protection against thermal degradation and also appears to improve processability.

Other conventional additives such as antioxidants and wetting agents such as those described in U.S, Pat. No. 3,351,495 may also be employed in conventional amounts.

The components of the extrusion mixture are blended together and fed to the hopper of an extruder capable of handling the high melt viscosity caused by the ultra high molecular weight polyolefin contained in the mixture. Such extruders and their operational conditions are well known to the art, and one such suitable device is a Colombo twin-screw extruder sold by LMP Italy.

The extrudate may be passed through a die to provide either a separator blank smooth on both sides or having ribs on one or both sides thereof. If ribs are employed, they may alternatively be separately formed on the separator blank by extrusion coating or embossing techniques.

While extruding the mixture of the present invention is the preferred mode of forming the sheet that is to be formed into a battery separator, it is also clear that other conventional sheet forming methods could be employed. These methods include calendaring, injection molding, compression molding, etc.

After the sheet is formed, it is subjected to an extraction process to remove a sufficient amount of the plasticizer to provide the desired optimum pore volume and porisity characteristics, up to about 98% by weight of the plasticizer initially employed. Some filler may also be incidentally removed during extraction.

The extraction is preferably carried out by subjecting the sheet to the action of a solvent for the plasticizer employed. The solvent chosen should not be a solvent for the polymeric constituents to any great extent at the extraction temperature employed. Such extractions are well established in the art, and reference is again made to U.S. Pat. No. 3,351,495 for examples of suitable plasticizer - solvent combinations.

Petroleum oil is the preferred plasticizer for the present invention due to its ready availability and ease of handling. Suitable extraction solvents for petroleum oil include chlorinated hydrocarbons such as trichloroethylene, tetrachloroethylene, tetrachloroethane, carbon tetrachloride, methylene chloride, etc., and hydrocarbons such as hexane, cyclohexane, benzene, toluene, etc.

The sheet is exposed to the extraction solvent for a time sufficient, at the temperture employed, to remove the desired amount of the particular plasticizer employed. It is preferred to carry out the extraction at about room temperature, although temperatures up to the melt dissolution temperature of the polymers may be employed.

After subjecting the sheet to the extraction solvent for the appropriate length of time, the sheet is removed from contact therewith and dried. The drying should be carried out at an elevated temperature that is not so great as to detrimentally affect the properties of the separator. In general it is preferred to carry out the drying at temperatures between about 25° and about 90° C. The drying is desirably effected in an enclosed space so that solvent vapors may be recovered.

The sheet thus produced will generaly be continuous in length, and may then be cut to the approximate size for use as a battery separator.

The battery separator formed in accordance with the present disclosure is "microporous;"i.e., will have an average pore size between about 0.002 and about 1 micron when measured by mercury intrusion techniques.

The battery separator of the present invention has good electrical resistance characteristics. To be commercially acceptable, separators should have an electrical resistance less than about 100 milliohms per square inch. Most separators commerically available appear to have an electrical resistance between about 20 and about 75 milliohms per square inch. The separators of the present invention have an electrical resistance between about 15 and about 50 milliohms per square inch for a 20 mil thick sheet.

The separator of the present invention may be made in any thickness desired for a particular end use. Most commercial separators range from about 20 to about 50 mils in thickness. The separators of the present invention may range in thickness between about 15 and about 50 mils and preferably between about 15 and about 20 mils. If ribs are employed they may be any height conventionally employed, generally from about 15 to about 200 mils.

The following specific examples illustrate various aspects of the present invention, but are not to be construed as limiting the scope of the invention beyond that set forth in the claims attached hereto.

EXAMPLE 1

In this example a polyolefin copolymer was employed which is sold under the trade name -70) XEA-7. This copolymer is an ethylene - acrylic acid copolymer having a melt index (ASTM 1238-70) in the range of 20 to 25 g per 10 min., and contains 7% acrylic acid by weight. The ultra high molecular weight, high density polethylene homopolymer employed is sold under the trade name Allied Chemical 1220, and has a melt index of 0.

A blend was prepared containing the following components:
  15% by volume polyolefin (50% weight Allied Chemical 1220 and 50% by weight Dexon XEA-7. This polyolefin mixture had a melt index of 0.40 g per 10 min.)
  15% by volume silica (Hisil 233)
  2% by volume carbon black (United 3017)
  68% by volume mineral oil (Shellflex 412)
  0.5% by volume antioxidant (Ionol)

The polyolefin copolymer (Dexon XEA-7) and the silica were preblended. The dry ingredients were then blended together in a Henschel high intensity mixer, and the mineral oil sprayed in while the blending was in progress.

The blend was then fed to the hopper of a twin screw extruder (Colombo) and extruded through a die to form a continuous web 42 inches wide and 20 mils thick. The web was smooth on both sides; i.e., had no ribs. The continuous web was then fed through a bath of trichloroethylene at room temperature (20° C) and for an average residence time of 15 minutes to extract the mineral oil. The extracted web was next dried in a hot air oven at a temperature of 75° C. Finally, the web was cut into battery separator sheets 5⅝ × 5 13/16 inches in size.

The resulting battery separator had an electrical resistance of 30 milliohms per square inch, a tensile strength of 955 psi and an elongation of 160%.

EXAMPLE 2

The procedure of example 1 was repeated except that 50% by weight of the polyolefin copolymer (Dexon XEA-7) was substituted with a low molecular weight polyethylene homopolymer (Super Dylan 7180 manufactured by Sinclair Koppers Co.) having a melt index of 18 g per 10 min. The resulting polyolefin mixture was thus comprised of 50% by weight ultra high molecular weight polyethylene (Allied 1220), 25% by weight polyolefin copolymer (Dexon XEA-7) and 25% by weight polyethylene (Super Dylan 7180). The effect of this substitution was to lower the acrylic acid content to 3.5% by weight of the mixture of Dexon XEA-7 and Super Dylan 7180. The melt index of the total polyolefin mixture was 0.24 g per 10 min.

The battery separator produced from the foregoing had an electrical resistance of 25 milliohms per square inch, a tensile strength of 500 psi and an elongation of 80%.

EXAMPLE 3

The procedure of example 1 was repeated except that the ultra high molecular weight polyethylene comprised 40% by weight of the polyolefin mixture and the polyolefin copolymer comprised 60% by weight thereof.

The battery separator produced from the foregoing had an electrical resistance of 30 milliohms per square inch.

I claim:
1. A battery separator comprising a microporous sheet of a size and configuration adapted to fit between and separate the plates of a battery, said sheet consisting essentially of a mixture of two polymeric constituents, a plasticizer and a siliceous filler;
  the first of said polymeric constituents in said mixture being a polyolefin homopolymer selected from the group consisting of polyethylene, polypropylene and mixtures thereof, said polyolefin homopolymer having an intrinsic viscosity greater than 3.0 and a standard load melt index of less than 0.04 g. per 10 minutes;
  the second of said polymeric constituents in said mixture being selected from the group consisting of (A) a copolymer of an olefin selected from the group consisting of ethylene and propylene and an ethylenically unsaturated monocarboxylic acid selected from the group consisting of acrylic acid, methacrylic acid and mixtures thereof wherein the ethylenically unsaturated acid constitutes between about 1% and about 10% by weight of said copolymer (A), and (B) a blend having a first constituent comprising a low molecular weight olefin polymer selected from the group consisting of homopolymers and copolymers of ethylene and propylene wherein the olefin polymer has a standard load melt index greater than about 10 and an intrinsic viscosity less than about 2.0 and having a second constituent comprising a polymer of an ethylenically unsaturated monocarboxylic acid selected from the group consisting of acrylic acid and methacrylic acid and wherein the ethylenically unsaturated acid constituent constitutes between about 1% and about 10% by weight of said blend (B);

said first polymeric constituent comprising between about 30% and about 60% by weight of said mixture of polymeric constituents;

said microporous sheet having been formed by the extrusion of an extrusion mixture wherein said siliceous filler comprised between about 10% and about 90% thereof, said plasticizer comprised between about 20% and about 70% thereof with up to about 98% of said plasticizer being subsequently removed by solvent extraction, and the remainder thereof consisted essentially of the mixture of two polymeric constituents.

2. The separator of claim 1 wherein the ethylenically unsaturated monocarboxylic acid constitutes between about 3% and about 4% by weight of the second of said polymeric constituents.

3. The separator of claim 1 wherein the second of said polymeric constituents is a copolymer of ethylene and acrylic acid.

4. The separator of claim 1 wherein the sheet is smooth on both sides thereof.

5. The separator of claim 1 wherein the sheet has ribs on at least one surface thereof.

6. The separator of claim 1 wherein the sheet has a thickness between about 15 and 50 mils.

* * * * *